UNITED STATES PATENT OFFICE.

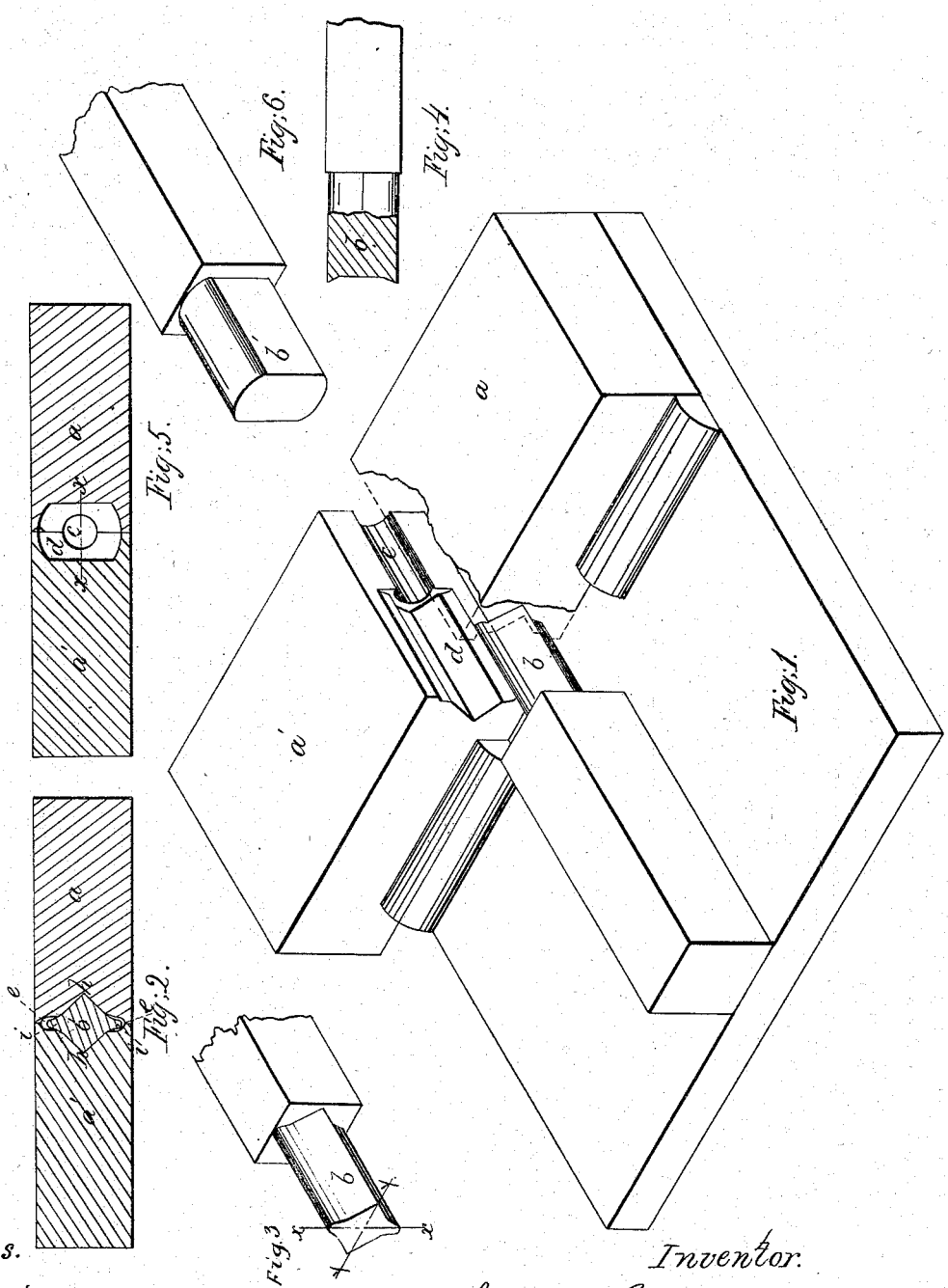

JAMES GRIBBEN, OF ALLEGHENY, PENNSYLVANIA.

IMPROVEMENT IN DIES FOR MAKING SQUARE BOLT-HEADS.

Specification forming part of Letters Patent No. 56,745, dated July 31, 1866.

*To all whom it may concern:*

Be it known that I, JAMES GRIBBEN, of the city of Allegheny, in the county of Allegheny and State of Pennsylvania, have invented a new and useful Improvement in Dies for Making Square-Headed Bolts; and I do hereby declare the following to be a full, clear, and exact description thereof, reference being had to the accompanying drawings, forming part of this specification, in which—

Figure 1 is a perspective representation of a pair of dies and plunger for making square-headed bolts. Fig. 2 is a vertical cross-section through the dies and plunger when the dies are closed and the plunger advanced to form the head. Fig. 3 is a perspective representation of the plunger or heading-tool similar to that shown in Fig. 1. Fig. 4 is a longitudinal section through the plunger in the line $x\ x$ of Fig. 3.

In the several figures like letters of reference denote similar parts.

"Square-head bolts" are so called because they have a square solid head. The shank is cylindrical. The under side of the head around the shank is a plane surface, while the top of the head is chamfered at the edges, so as to leave it highest in the middle over the shank.

In the manufacture of square-head bolts it is most usual and convenient to use round iron—that is, cylindrical rods—of the diameter of the shank of the bolt. As the head is considerably larger in diameter than the shank, it is formed by heating the head end of the rod and inserting it into the square cavity of a pair of dies, the round shank being held firmly by a pair of griping-dies, while a heading-tool staves up the heated iron in the square cavity to form the head.

Two practical difficulties are incident to this mode of manufacture which it is the purpose of my improvement to obviate. These difficulties are, first, that it is almost impossible to force the iron into the angles or corners of the square cavity of the die so as to make a well-shaped head; and, second, that the neck of the bolt is weakened by the disruption of the fibers of the iron caused by the staving up of the head.

In order to enable others skilled in the art to construct and use my improved machinery for making square-head bolts, I will proceed to explain its nature and the manner in which it is operated.

In the drawings, $a\ a'$ are a pair of dies, one of which, $a$, may be stationary, and the other, $a'$, movable sidewise to and from the die $a$, their opposite faces being always parallel.

In Fig. 1 the die $a'$ is drawn back, and the face portion of the stationary die is broken away so as to show the cavities in the moving die $a$, which are an exact counterpart of the cavities in the face of the stationary die $a$.

The front portion of the dies when closed have a cylindrical cavity of the same diameter as the shank of the bolt. This cavity (marked $c$ in Fig. 1) forms the griping portion of the dies. The rear portion of the dies have an enlarged cavity, within which the head is formed by staving up the iron rod. The shape of the head-cavity (marked $d$ in Fig. 1) when the dies are closed is shown in Fig. 2. The sides of the head-cavity are at an angle of forty-five degrees to the face of the dies, the angles $h\ h$ being right angles; but at the face of the dies the cavity is enlarged and rounded, as at $e\ e$, Fig. 2.

The plunger or heading-tool $b$, instead of being exactly square, is rectangular at the angles $y\ y$, Fig. 3, those angles fitting closely into the angles $h\ h$ of the cavity $d$ in the dies, while the remaining angles or corners $i\ i$ are enlarged and rounded, but not so much enlarged as the corresponding part of the cavity $d$ of the dies, so that, while the plunger $b$ fits the cavity of the dies $a\ a'$ when they are closed at all other points of its perimeter, it does not quite fill up the rounded corners $e\ e$ at the top and bottom of the cavity $d$, as seen in Fig. 2.

The face or end of the plunger or heading-tool $b$ is curved in the direction of the line X X of Fig. 3, while it is straight in the line Y Y.

The operation of the dies and plunger thus constructed is as follows: The rod of iron from which the bolt is to be made is heated to a welding temperature at one end, which is inserted into the cavity of the dies until it touches the end of the plunger $b$, which is drawn back and serves as a gage. The dies then close, the griping portion $c$ holding the rod firmly. The header then advances in the cavity $d$ of the dies and staves up the iron. The angles $h\ h$ in the dies will not be quite filled; but the corners $e\ e$, being enlarged and rounded, will be filled with iron, and there will be a flash or fin of iron projecting over the edge of the plunger at these points. The dies are then opened and the bolt is turned half round, bringing the enlarged corners *i i* of the head into the angles *h h* of the die, and the corners *s s* of the head, which are not full enough, into the enlarged corner *e e* of the dies. The dies are then closed again and the header is advanced, whereby the full corners of the head are reduced and squared, and the other corners, which were not full enough, are enlarged. This operation is repeated three or four times until the head is made full at all the corners, and with sharp and well-defined angles, and all flash or fin at the corners is removed by the enlarged corners *i i* of the heading-tool *b*, which extend beyond the corners of the head.

The chamfered shape usual in square-head bolts is given to the top of the head by the curvature of the heading-tool shown in Fig. 4.

I have represented and described the dies with the griping portion and the heading portion in one piece, two dies only being used.

If preferred, that portion of the dies which contains the circular cavity *c* for holding the shank of the bolt may be made in a separate piece from that part of the dies which contains the heading-cavity *d*.

Having thus described my improvement, what I claim as my invention, and desire to secure by Letters Patent, is—

The use of dies for making square-head bolts, the heading-cavity of which is enlarged at two opposite corners beyond the dimension of the bolt-head to be formed, while the two remaining corners are of the required shape and dimension or distance apart, in combination with a heading-tool or plunger so shaped as to fit closely into or against those last-named corners, while the remaining corners of the heading-tool or plunger are enlarged, substantially as and for the purposes hereinbefore set forth.

In testimony whereof I, the said JAMES GRIBBEN, have hereunto set my hand

JAMES GRIBBEN.

Witnesses:
ALLAN C. BAKEWELL,
W. D. LEWIS.